United States Patent [19]

Mayhak

[11] Patent Number: 4,970,819
[45] Date of Patent: Nov. 20, 1990

[54] FIREARM SAFETY SYSTEM AND METHOD
[75] Inventor: Gary D. Mayhak, Scottsdale, Ariz.
[73] Assignee: V/GER, Inc., Scottsdale, Ariz.
[21] Appl. No.: 411,636
[22] Filed: Sep. 25, 1989
[51] Int. Cl.⁵ .............................................. F41A 17/06
[52] U.S. Cl. .................................................... 42/70.01
[58] Field of Search ............................. 42/70.01, 70.11

[56] References Cited

U.S. PATENT DOCUMENTS

| | | |
|---|---|---|
| 3,939,679 | 2/1976 | Barker et al. |
| 4,003,152 | 1/1977 | Barker et al. |
| 4,067,132 | 1/1978 | Smith . |
| 4,105,885 | 8/1978 | Orenstein . |
| 4,135,320 | 1/1979 | Smith . |
| 4,141,166 | 2/1979 | Schultz . |
| 4,154,014 | 5/1979 | Smith . |
| 4,457,091 | 7/1984 | Wallerstein . |
| 4,467,545 | 8/1984 | Shaw, Jr. |
| 4,488,370 | 12/1984 | Lemelson . |
| 4,563,827 | 1/1986 | Heltzel . |
| 4,682,435 | 7/1987 | Heltzel . |

Primary Examiner—Charles T. Jordan
Assistant Examiner—Richard W. Wendtland
Attorney, Agent, or Firm—Cahill, Sutton & Thomas

[57] ABSTRACT

Actuation of the firing mechanism of a firearm is prevented until grip pattern sensing means on the handgrip of the firearm supply to a microprocessor signals corresponding to a grip pattern stored in a programmed simulated neural network memory. All of these components are contained within the firearm. Programming of the neural network memory is accomplished by using a host computer with a simulated neural network to train that network to recognize a particular grip pattern using grip pattern signals generated by the grip pattern sensing means as the sensing means is repeatedly gripped for the person for whom the firearm is to be programmed.

4 Claims, 1 Drawing Sheet

FIREARM SAFETY SYSTEM AND METHOD

TECHNICAL FIELD

This invention is concerned with preventing the discharge of a firearm by anyone other than an authorized user.

BACKGROUND ART

History is replete with instances in which owners of firearms have been seriously injured and even killed by their own weapons in the hands of another person. Even law enforcement officers have fallen into circumstances under which criminals have wrested control of the officers'handguns and used them against the officers. And all too often children playing with firearms belonging to parents have inflicted grievous harm on their playmates.

As a consequence of these and similar disasters others have been moved to propose means for preventing the discharge of a firearm except when it is handled by its rightful owner or other authorized user. A firearm thus conditioned is sometimes referred to as an "owner loyal" firearm.

James N. Barker and Edward A. Cartwright in their U.S. Pat. No. 3,939,679, granted Feb. 24, 1976 for "SAFETY SYSTEM" disclose a revolver having a radio receiver in its handgrip which prevents the firing mechanism from being operated unless and until the receiver detects a predetermined distinctive signal from a transmitter worn by the authorized user of the revolver. The transmitter is housed, for example, in a bracelet worn by the user.

One of the disadvantages of the Barker and Cartwright system is that the authorized user has the hassle of contending with and transporting two items instead of just the firearm. Another disadvantage is that the safety feature vanishes if both the firearm and the transmitter fall into the hands of an unauthorized user. This certainly could happen if the two items are stored together.

A somewhat similar safety system is disclosed in U.S. Pat. No. 4,488,370, granted Dec. 18, 1984 to Jerome A. Lemelson for "WEAPON CONTROL SYSTEM AND METHOD". This patent suggests incorporating electronic circuitry in the firearm for cooperating with another electronic device in a finger ring, bracelet or wristwatch on the authorized user to control discharge of the firearm. This system possesses the same disadvantages as the Barker and Cartwright system.

There continues to be a need for a firearm which cannot be discharged unless held in the hand of the authorized user.

DISCLOSURE OF THE INVENTION

This invention makes it possible for a firearm to sense the grip pattern of the hand of a potential user and permit its firing mechanism to be actuated only if it senses a particular grip pattern of an authorized user which it has been programmed to recognize. The system includes grip pattern sensing means on the handgrip of the firearm, a simulated neural network memory capable of recognizing a particular grip pattern and a microprocessor for accessing the neural network to inquire whether it recognizes the grip pattern being sensed by the sensing means. The microprocessor also controls means for permitting and preventing actuation of the firing mechanism of the firearm to allow the firearm to be discharged only when the grip pattern sensed by the sensing means is that of the authorized user which the simulated neural network memory has been programmed to recognize.

BRIEF DESCRIPTION OF THE DRAWINGS

The invention is described in greater detail hereinafter by reference to the accompanying drawings wherein.

BEST MODE FOR CARRYING OUT THE INVENTION

Figure 1:
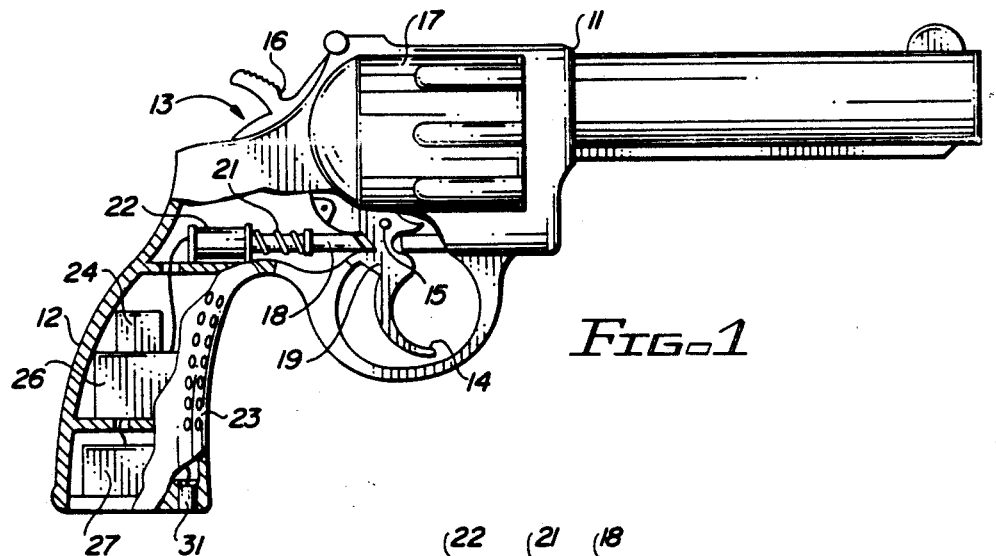
FIG. 1 is an elevational view of a firearm equipped with this invention. Portions of the firearm have been broken away to reveal components of the invention which are diagrammatically displayed.

Referring particularly to FIG. 1, the reference numeral 11 designates generally one type of firearm which can beneficially employ this invention. The firearm, in this instance a revolver-type handgun, is of more or less conventional mechanical construction. The firearm is held by a handgrip 12 and is discharged by actuating a firing mechanism designated generally by reference numeral 13.

The firing mechanism 13 includes a finger actuated trigger 14 pivotally mounted in the frame of the gun at 15. Movement of trigger 14 cocks and then releases a hammer 16 to fire a shell (not shown) in a rotatable cartridge cylinder 17.

Like most firearms, revolver 11 is equipped with a safety means which prevents and permits the firing mechanism 13 to be actuated. In this instance, the safety is a sliding latch member 18 adapted to engage a pawl 19 on trigger 14. Latch member 18 is biased by a spring 21 to the right as shown in FIG. 1 to a position in which it is in the path of movement of pawl 19 on trigger 14 when the ladder is swung about pivot 15. In this position latch member 18 prevents movement of trigger 14 and, hence, prevents actuation of the firing mechanism.

In accordance with this invention, latch member 18 is adapted to be retracted (moved to the left from the position shown in FIG. 1) by a solenoid 22 to a position clear of the path of travel of trigger pawl 19. With latch member 18 in its retracted position, the firing mechanism can be actuated to discharge the firearm.

This invention is particularly concerned with control of the position of latch member 18 in accordance with whether the firearm is held by an authorized user or by an unauthorized user. The control is such that solenoid 22 is energized to retract latch member 18 only when the handgrip 12 is gripped by the hand of the authorized user of the firearm. The invention contemplates the use of grip pattern sensing means 23 on the handgrip 12 coupled with means for distinguishing between the grip pattern of the authorized user and the grip patterns of others.

To accomplish its intended purpose, the firearm 11 is equipped with a safety system which includes grip pattern recognition means in the form of a simulated neural network memory 24 and means for comparing the grip pattern sensed by said pattern sensing means 23 with the grip pattern recognized by said neural network memory 24. This comparing means preferably takes the form of a microprocessor 26. These components together with a source of power, such as a battery 27, can easily be positioned within the frame of the firearm handgrip 12 as shown diagrammatically in FIG. 1.

A simulated neural network is particularly suited for performing the grip pattern recognition and distinguishing functions for the safety system of this invention. Artificial neural networks mimic behavior of the brain in that they can be taught to recognize and distinguish between different patterns and shapes. Once the neural network has been trained to recognize a particular pattern, it can do so even though it later is presented with small variations or incomplete information about that pattern. The neural network is thus ideally suited for recognizing a particular handgrip pattern impressed on sensing means 23 even though the authorized user may place his hand in a slightly different location or apply slightly different pressures with each grip. The neural network can be trained to take such variations into account and still distinguish the grip pattern for which it is programmed from grip patterns created by others who are not authorized to use the firearm.

The operating characteristics and architecture of simulated neural networks are well-known and are explained in publications such as *Introduction to Neural Networks*, by Jeannette Stanley, Copyright 1988, 1989, California Scientific Software, Sierra Madre, Calif. 91024, which publication is incorporated herein by reference.

Strictly speaking, a simulated neural network does not possess a memory in the sense that a computer has a memory. Instead, the training of a pattern recognition neural network involves repeatedly subjecting its input neurons to signals corresponding to the pattern, including variations thereof. This establishes interconnections between the input neurons, the hidden neurons and the output neuron, so that, eventually, when the trained network is subjected to a pattern signal the output is either "yes" or "no" that it is or is not the pattern it has been trained to recognize. A trained neural network will exhibit a particular pattern of interconnections between neurons therein and the pattern of connection strengths between neurons is equivalent to memory for that network.

Figure 2:
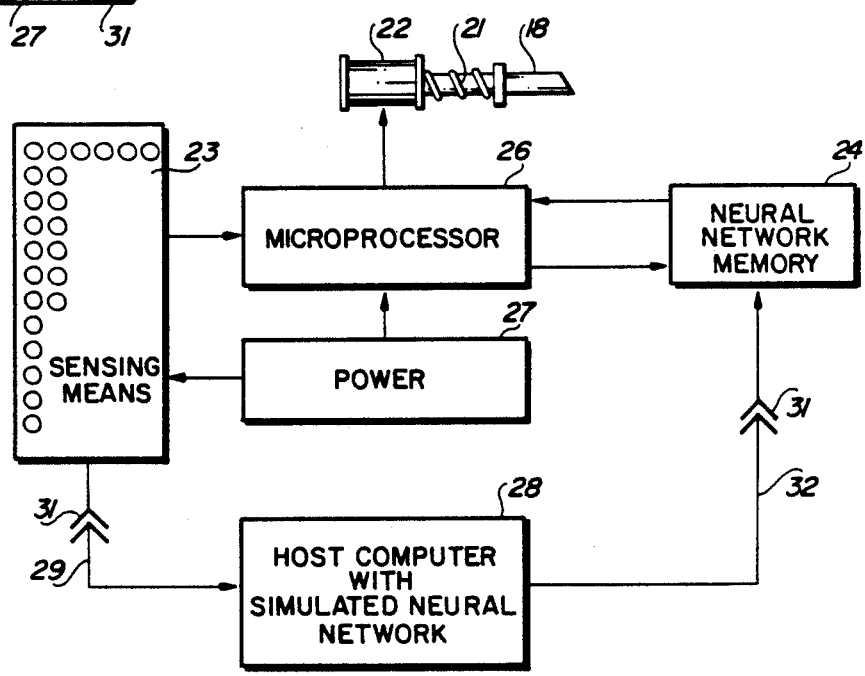
FIG. 2 is a functional block diagram illustrating operation of the invention.

According to this invention, the neural network training function is performed utilizing a host computer 28 containing a simulated neural network therein. FIG. 2 illustrates diagrammatically how this is done.

Grip pattern signals from sensing means 23 are fed from the firearm 11 over a line 29 to the host computer. A jack 31 in the butt of firearm handgrip 12 permits line 29 to be connected to the firearm.

Host computer 28 preferably is located at the point of sale or other distribution of the firearm 11. The owner or other authorized user repeatedly grips the grip pattern sensing means 23 on the handgrip 12 to generate signals to host computer 28 which utilizes those signals to train the neural network therein. Many, many thousands of pattern signals can be employed in a short period of time to train a neural network. The training session may also include supplying the host computer 28 with unauthorized grip patterns which are manipulated by the host computer to train the neural network as to the type of pattern it is not to recognize.

When the neural network and host computer 28 has been trained its "memory", i.e., the pattern or table of neuron connection strengths, is transferred over a line 32 to the simulated neural network memory 24 in the handgrip 12 of the firearm. The advantage of utilizing a separate host computer 28 is simply size and weight reduction for the firearm 11. The task of training a neural network with today's computer technology requires equipment which simply is too large to be incorporated in the firearm. Storage of only the network memory in memory 24 where it can be accessed by microprocessor 26 takes up far less space and adds little weight to the firearm.

This invention permits the firearm safety system to accommodate changes in ownership or change in authorized users. With such a change, the simulated neural network is simply retrained to recognize the handgrip pattern of the new user.

Figure 3:
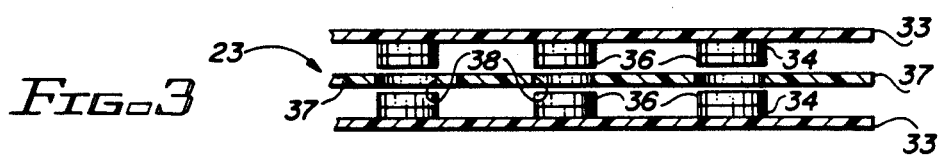
FIG. 3 is a greatly enlarged and exaggerated fragmentary sectional view through a sensing unit utilized in the invention.
Figure 4:
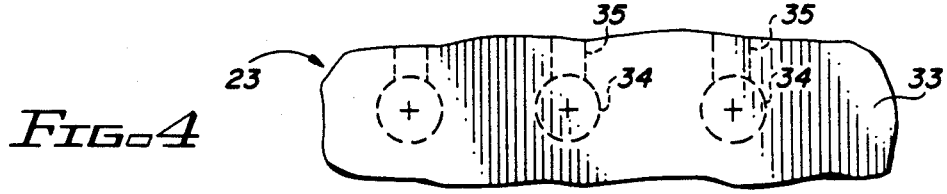
FIG. 4 is an enlarged fragmentary surface view of the sensing unit of FIG. 3.

It can be appreciated that the grip pattern sensing means 23 can take a variety of forms. One form particularly suited for the system of this invention is illustrated in FIGS. 3 and 4. This is a pressure-sensitive unit utilizing variable resistance contacts to generate signals. The sensing means 23 is a sandwich in which the outer sheets 33 have electrical conductor disks 34 imprinted thereon. Sheets 33 are preferably made of flexible, electrically resistant, plastic sheet material such as Mylar brand polyester plastic. Electrical leads 35 connect disks 34 to the output (not shown) of the sensing means. Each conductor disk 34 has a resistive contact 36 deposited thereon. With no pressure applied to any portion of the sheet 33, juxtaposed contacts 36 are separated by a thin sheet of flexible plastic material which has openings 38 positioned between juxtaposed contacts.

When pressure is applied to one of the outer sheets 33, one or more of the juxtaposed resistance contacts are brought into contact enabling those contacts to establish an electrical circuit to initiate an output signal. The flexibility of separator sheet 37 permits the contacts 36 to come into greater, i.e., closer, contact with greater pressure being applied to outer sheets 33. Thus, the circuit through each pair of contacts 36 exhibits variable current flow indicative of the pressure being applied to that pair of contacts. Overall, the grip pattern sensing means is capable of emitting not only an on/off signal for each pair of contacts 36 but that signal also indicates the degree or amount of pressure applied to each such contact pair.

From the foregoing, it should be apparent that this invention provides an improved firearm safety system and a method of operating that system. This system offers a significant advantage of recognizing an authorized user to permit the firearm to be discharged only by that authorized user. And the desired result is accomplished without requiring that the authorized user carry or wear a separate recognition device.

What is claimed is:

1. In a firearm safety system for a firearm having a handgrip and a firing mechanism, the combination of safety means for preventing and permitting actuation of said firing mechanism, pressure sensing means on said handgrip for sensing the grip pressure pattern of the person holding the firearm, grip pressure pattern recognition means in said firearm for recognizing a particular grip pressure pattern, said pattern recognition means including a simulated neural network memory, means for comparing the pattern sensed by said sensing means with the pattern recognized by said recognition means and for causing said safety means to permit actuation of said firing mechanism only when the grip pattern sensed by said sensing means is recognized by said recognition means.

2. The safety system of claim 1 wherein said grip pattern comparing means is a microprocessor.

3. The safety system of claim 1 further including means utilizing the grip pattern sensing means to program said recognition means to recognize a particular grip pattern.

4. A method of programming a safety system for a firearm having a handgrip and a firing mechanism in which the system includes safety means for preventing and permitting actuation of said firing mechanism, sensing means on the firearm handgrip for sensing the grip pattern of the person holding the firearm, grip pattern recognition means in said firearm and programmable to recognize a particular grip pattern, and means for comparing the grip pattern sensed by said sensing means with the grip pattern programmed into said recognition means and for causing said safety means to permit actuation of said firing mechanism only when the grip pattern sensed by said sensing means matches the grip pattern programmed into said recognition means, comprising the steps of:

(a) establishing connections for transferring signals between the firearm and a computer having a simulated neural network;

(b) causing a person to repetitively grip the handgrip of the firearm to cause said grip pattern sensing means to output signals corresponding to the grip pattern of that person;

(c) feeding the output signals from said grip pattern sensing means to said computer to teach said network to recognize the grip pattern of that person;

(d) transferring the memorized recognition factors in said neural network to said recognition means in the firearm to program said recognition means to recognize the grip pattern of said person; and (e) disestablishing said signal transferring connections between said firearm and said computer.

* * * * *